United States Patent Office 3,726,874
Patented Apr. 10, 1973

3,726,874
METHODS FOR PRODUCTION OF 2,9-DICARBOXYQUINACRIDONE
Edward E. Jaffe, Union, N.J., assignor to E. I. du Pont de Nemours and Company, Wilmington, Del.
No Drawing. Filed May 6, 1971, Ser. No. 140,983
Int. Cl. C07d 39/00
U.S. Cl. 260—279 R    4 Claims

ABSTRACT OF THE DISCLOSURE

This invention relates to the preparation of 2,9-dicarboxyquinacridone by hydrolysis of 2,9-bistrifluoromethylquinacridone.

BACKGROUND OF THE INVENTION

Copending application Ser. No. 140,984 filed concurrently herewith discloses 2,9 - dicarboxyquinacridone, a novel red-colored quinacridone derivative which is characterized by a high level of color stability as a pigment in plastic extrusions at temperatures up to about 320° C., and various methods for the production thereof.

SUMMARY OF THE INVENTION

In accordance with the present invention there is provided a novel method for the preparation of 2,9-dicarboxyquinacridone (I) by hydrolysis in acid medium of 2,9-bistrifluoromethylquinacridone (II) according to the equation:

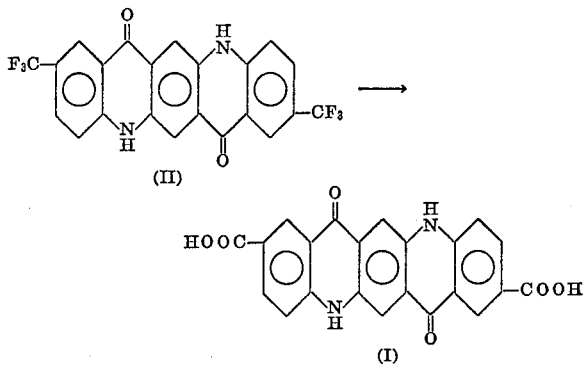

The compound II, an interesting pigment in its own right demonstrating its relative chemical stability, has thus been found to be a useful intermediate in the preparation of (I). This is indeed surprising since the trifluoromethyl substituted aromatic compounds, e.g. trifluoromethylbenzene, are for the most part considered to be chemically inert.

The preparation of the compound 2,9-bistrifluoromethylquinacridone (II) is given in copending application Ser. No. 74,535 filed Sept. 22, 1970. The hydrolysis thereof is effected in accordance with the present invention under acid conditions at room temperature or above. Advantageously the hydrolysis is effected in sulfuric acid or polyphosphoric acid for at least 5 minutes at temperature of at least 70° C. Although at room temperature some hydrolysis occurs at least with more concentrated acids, a higher temperature is normally desired to make it proceed at a more reasonable rate. At about 100° C.–200° C. the reaction proceeds well and generally there is no particular advantage in even higher temperatures. Other hot strong acids such as $AlCl_3$ eutectic with NaCl will also cause the hydrolysis of (II) to yield 2,9-dicarboxyquinacridone.

The use of concentrated sulfuric acid, as shown in Example I, is especially suitable for conducting the hydrolysis since it can also serve as the medium for high turbulence drowning into water in order to achieve effective particle size reduction for pigmentary applications. In any case, reaction in sulfuric acid medium depends upon dissolution of at least a portion of the 2,9-bistrifluoromethylquinacridone and will be seen to involve a time-temperature-acid concentration relationship. Thus an aqueous acid solution containing as little as 60% $H_2SO_4$ by weight can be used provided higher temperatures, i.e. of 100° C. to 200° C., are used for periods of at least ½ hour.

A hydrolysis in commercial polyphosphoric acid (as illustrated in Example II) can be followed if desired by final addition of methanol or ethanol, rather than water, leading to a pigment of improved texture. In general such an acid should contain at least 95% by weight $H_3PO_4$.

The compound 2,9-dicarboxyquinacridone exhibits outstanding pigmentary properties, especially as regards color and heat stability, when incorporated in compositions such as plastics where the conditions required for fabrication of colored articles are quite severe. This material is found to be especially color- and heat-stable under the severe fabrication conditions required for production of plastic articles and particularly those comprising polyamides and polyester compositions. Plastic compositions employing the 2,9-dicarboxyquinacridone pigment are characterized by cleanness, brightness, and uniformity of color as well as by stability toward heat and light.

The following examples are given to illustrate the invention. Parts and percentages are by weight unless otherwise indicated.

EXAMPLE I (A) Preparation of diethyl-2,5-bis-(p-trifluoromethylphenylamino)-3,6-dihydroterephthalate Fifty-one and two-tenths parts (0.2 mole) of diethyl succinylsuccinate is placed in a suitable vessel equipped with an agitator, reflux condenser and means for maintaining an inert atmosphere in the vessel. After introducing an inert atmosphere of nitrogen which is then maintained throughout subsequent steps, 480 parts of denatured ethanol and 70 parts (0.435 mole) of p-trifluoromethylaniline are introduced followed by 1 mole of concentrated HCl. The reaction mixture is then heated to the boil whereupon a clear solution is obtained. Reflux is continued for a five-hour period, during which time a solid gradually precipitates out of solution. After cooling, the solid is removed by filtration, washed with alcohol, and reslurried in 400 parts of ethanol to which 3.6 parts of sodium carbonate in 50 parts water is added, and the mixture stirred for about 10 minutes to neutralize the amine hydrochloride catalyst. The solid is again filtered from the slurry, washed with water until chloride and base free, and dried at 60° C. to give 94.0 parts of a light colored solid (86.8% yield). A small sample recrystallized from denatured alcohol showed a melting point of 209–211° C.

Found: N, 5.43%. Calculated for $C_{26}H_{24}F_6N_2O_4$: N, 5.16%.

(B) Preparation of 2,9-bistrifluoromethyl-6,13-dihydroquinacridone

Eleven-hundred parts of purified "Dowtherm A" (the eutectic mixture of 23.5% biphenyl and 76.5% diphenyl ether) is placed in a suitable vessel equipped with an agitator, a distillation set-up and means for maintaining an inert atmosphere. The solvent is blanketed with an inert nitrogen atmosphere which is maintained throughout the experiment. The "Dowtherm A" is heated to a vigorous reflux and, over a period of about one hour, 93 parts of diethyl - 2,5-bis-(p-trifluoromethylphenylamino)-3,6-dihydroterephthalate is uniformly added. The product ethanol is allowed to distil out of the reaction mixture.

The insoluble product precipitates out of the boiling "Dowtherm A." After completion of the addition, reflux is continued for another two hours, the resulting suspension cooled to about 100° C. and the solid removed by filtration followed by washing with alcohol on the funnel. After drying, 71.5 parts (92.8% yield) of light tan 2,9-bistrifluoromethyl-6,13-dihydroquinacridone is obtained.

Found: N, 5.79%. Calc. for $C_{22}H_{12}N_2F_6O_2$: N, 6.22%.

(C) Preparation of 2,9-bistrifluoromethylquinacridone

Seventy-one parts of the 2,9-bistrifluoromethyl-6,13-dihydroquinacridone together with 1920 parts of denatured ethanol are placed in a vessel equipped with an agitator and reflux condenser. A solution of 106 parts sodium hydroxide in 106 parts of water is added and the mixture stirred at room temperature over a period of 15 minutes, after which 71 parts of sodium m-nitrobenzene sulfonate is added. The agitated mixture is heated to the boil and kept under reflux for 1.5 hours. It is then diluted with a large excess of cold water and the precipitate isolated by filtration followed by washing with water until alkali-free. The product is dried at 80° C. to give 69.0 parts (97.8% yield) of a bluish-red powder identified as 2,9-bistrifluoromethylquinacridone.

(D) Preparation of 2,9-dicarboxyquinacridone in sulfuric acid medium

One and one-half parts of 2,9-bistrifluoromethylquinacridone is suspended in 46 parts of concentrated sulfuric acid (96%), and the mixture stirred and heated to 118–120° C. and maintained for 2¼ hours.

Samples of the hot solution withdrawn during the reaction and hydrolyzed in water showed a progressive change of the initial magenta colored material to that of a red color.

The resultant solution is cooled and drowned into a mixture of ice and water. The precipitated solid is removed by filtration and washed with water until the filtrate is free of acid and sulfate. After drying, 1.29 part of product is obtained, constituting a yield of 96.2%.

The infrared spectrum of the product is totally different from that of the starting material but essentially identical with that of a sample of 2,9-dicarboxyquinacridone produced by an alternative route.

The intermediate solution of 2,9-dicarboxyquinacridone in concentrated sulfuric acid is ideally suited for purification of the product. Thus slow addition of a calculated amount of water to a portion of the solution to bring the concentration to 85% acid, while maintaining the temperature at about 50° C., causes precipitation of the sulfate of (I). The solid is filtered, washed with 80% sulfuric acid and then decomposed with ice and water. The red solid is filtered and washed acid and sulfate free. The product is identified by its infrared spectrum and its elemental analysis.

Calc. for $C_{22}H_{12}N_2O_6$: N, 7.00%. Found: N, 6.73.

Its X-ray pattern is essentially that of 2,9-dicarboxyquinacridone in the polymorphic form characterized by one strong, one medium and five weak bands of the following interplanar spacings in angstrom units: 16.05 (weak), 6.55 (medium), 6.10 (strong), 5.06 (weak), 4.11 (weak), 3.45 (weak), and 3.23 (strong).

EXAMPLE II

Preparation of 2,9-dicarboxyquinacridone in polyphosphoric acid medium

One and one-half parts of 2,9-bistrifluoromethylquinacridone is added to 50 parts polyphosphoric acid and the mixture stirred and heated to 145–155° C. and maintained for four hours. The mixture is cooled, and an excess of water added slowly while keeping the temperature below 60° C. The precipitated red solid is removed by filtration and washed with water until free of acid. After drying 1.1 parts of product is obtained, and this is identified as 2,9-dicarboxyquinacridone by its infrared spectrum. The X-ray pattern is essentially the same as that of the polymorphic form of 2,9-dicarboxyquinacridone characterized by an X-ray diffraction pattern of two strong, one medium, and four weak bands of the following interplanar spacings in angstrom units: 17.66 (weak), 5.75 (medium), 5.06 (weak), 4.23 (weak), 3.65 (weak), and 3.23 (strong).

EXAMPLE III

Preparation of 2,9-dicarboxyquinacridone in sulfuric acid medium

One part of 2,9-bistrifluoromethylquinacridone is suspended in 33.3 parts of 80% $H_2SO_4$ and the mixture stirred and heated to 165–170° C. for 4 hours. Thereafter it is cooled, diluted with water, filtered, washed with water, and dried. The product is essentially all 2,9-dicarboxyquinacridone as determined by its infrared spectrum.

When the procedure is repeated using 65% $H_2SO_4$, the product, while predominately 2,9-dicarboxyquinacridone, contains some unhydrolyzed starting material. Below 50% $H_2SO_4$, the solubility of the 2,9-bistrifluoromethyl is apparently insufficient for the reaction to proceed at a reasonable rate.

What is claimed is:

1. Method for the production of 2,9-dicarboxyquinacridone by subjecting 2,9 - bistrifluoromethylquinacridone to a temperature of at least 70° C. for at least 5 minutes in an acid selected from the group consisting of sulfuric acid of at least 65 percent by weight $H_2SO_4$ and polyphosphoric acid.

2. Method according to claim 1 wherein the acid is sulfuric acid.

3. Method according to claim 1 wherein the temperature is 100° C.–200° C.

4. Method according to claim 1 wherein the acid is polyphosphoric acid.

References Cited

UNITED STATES PATENTS 2,967,894  1/1961  Pummer _____ 260—515 A
3,530,136  9/1970  Hsia _____ 260—279 R

FOREIGN PATENTS 22,417  9/1969  Japan _____ 260—279 R

OTHER REFERENCES

Bensley et al.: Jour. Chem. Soc. (London), 287–296 (1956).

Hine et al.: Jour. Am. Chem. Soc., vol. 73, p. 22–3 (1951).

Filler et al.: Jour. Org. Chem., vol. 25, pp. 733–6 (1960).

Le Favre Jour. Am. Chem. Soc., vol. 71, pp. 4148–9 (1949).

Wagner et al.: "Synthetic Organic Chemistry," Wiley, p. 418 (1953).

DONALD G. DAUS, Primary Examiner

U.S. Cl. X.R.

260—471 A, 515 A